Jan. 9, 1951 J. W. GALLAGHER 2,537,524
COMBINED CORD REEL AND STAND FOR ELECTRIC IRONS
Filed Sept. 19, 1947 2 Sheets-Sheet 1

INVENTOR.
JACK W. GALLAGHER,
BY
McMorrow, Berman & Davidson
ATTORNEYS.

Jan. 9, 1951 — J. W. GALLAGHER — 2,537,524
COMBINED CORD REEL AND STAND FOR ELECTRIC IRONS
Filed Sept. 19, 1947 — 2 Sheets-Sheet 2
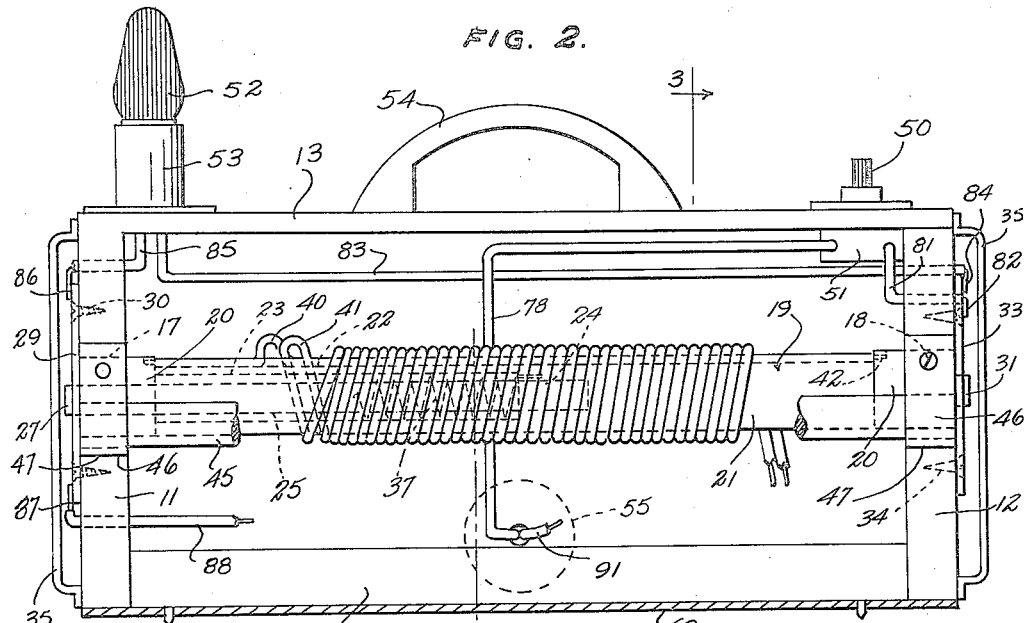
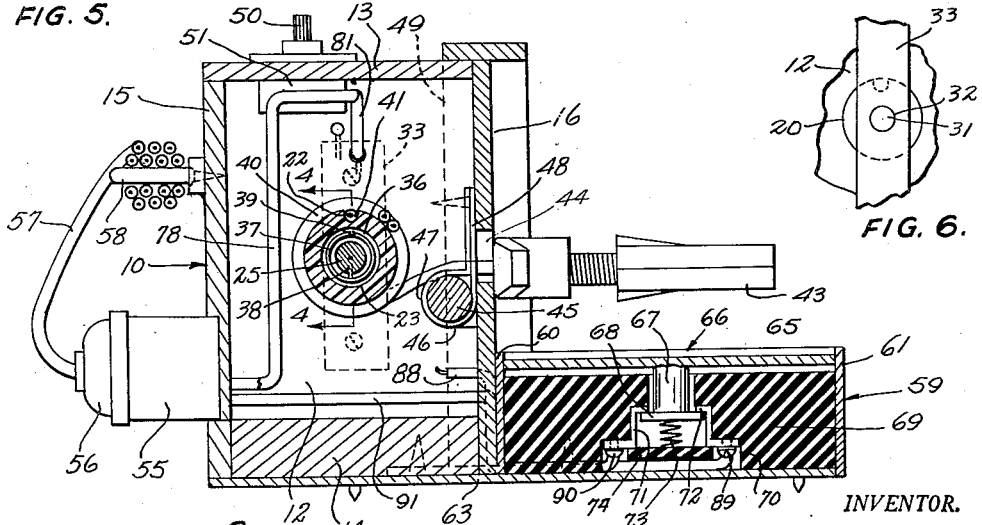
INVENTOR.
JACK W. GALLAGHER,
BY
McMorrow, Berman & Davidson
ATTORNEYS Patented Jan. 9, 1951

2,537,524

UNITED STATES PATENT OFFICE 2,537,524

COMBINED CORD REEL AND STAND FOR ELECTRIC IRONS

Jack W. Gallagher, Toledo, Ohio

Application September 19, 1947, Serial No. 774,988

2 Claims. (Cl. 191—12.4)

My invention relates to a combined electric cord reel and stand for electric irons.

An important object of the invention is to provide a stand for electric irons, such stand being actuated by the iron to cut off the electric current thereto, while the iron is at rest.

A further object is to provide a stand and cord reel unit for electric irons, having signal means to indicate when electric current is flowing to the iron, and when such current is cut off.

A still further object of the invention is to provide a portable stand and electric cord reel for electric irons, the device being simple in design, durable, and inexpensive to manufacture.

Other objects and advantages of the invention will be apparent during the course of the following description.

In the accompanying drawings, forming a part of this application, and in which like numerals are employed to designate like parts throughout the same, Figure 1 is a plan view of the combined cord reel and iron stand embodying the invention, Figure 2 is a side elevation of the device with the front side removed, part in section.

Figure 3 is a transverse vertical section taken on line 3—3 of Figure 2,

Figure 4 is a fragmentary longitudinal vertical section taken on line 4—4 of Figure 3, parts omitted, Figure 5 is a fragmentary end elevation of the device as shown in Figure 4, Figure 6 is a similar view of the opposite end of the device, and, Figure 7 is a diagrammatic view of an electric circuit constituting a part of the invention.

Figure 1:
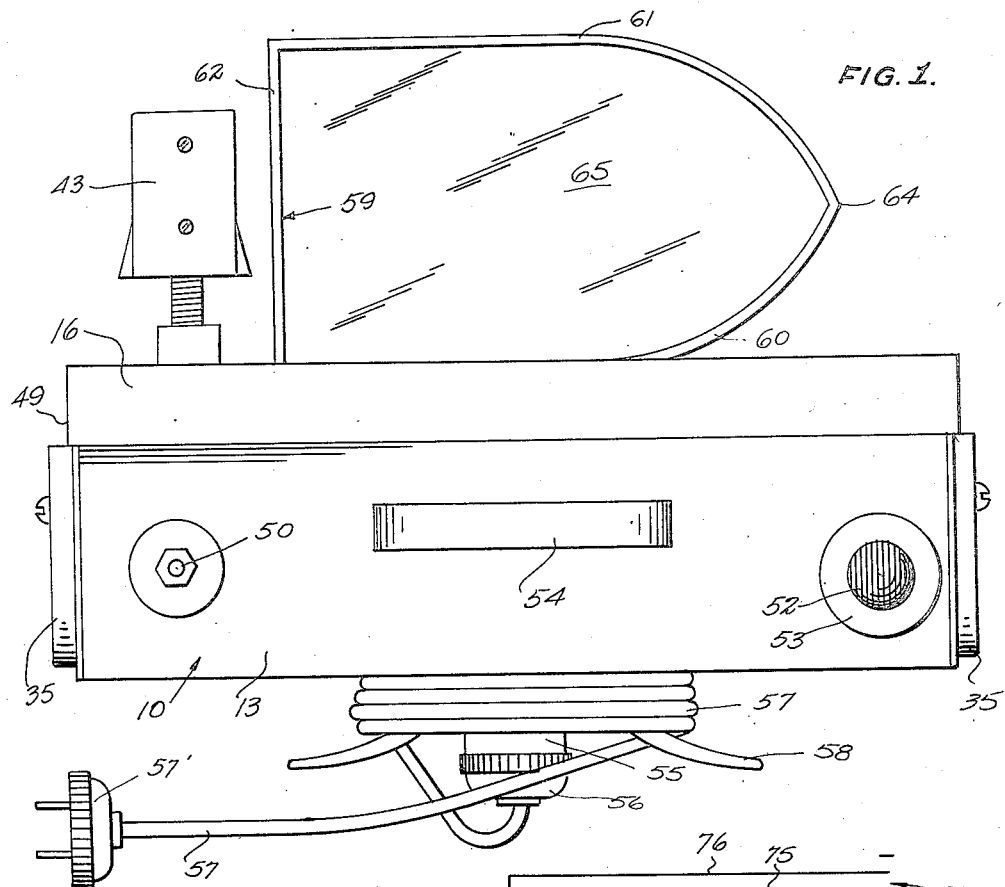

In the drawings, where for the purpose of illustration is shown a preferred embodiment of the invention, the numeral 10 designates a box or casing, which is preferably rectangular and elongated. This casing 10 comprises ends 11 and 12, a top 13, bottom 14, rear side 15, and removable front side 16.

Disposed longitudinally and centrally within the casing 10, and journalled in openings 17 and 18, in the ends 11 and 12 respectively, is a horizontal cylindrical roller or cord reel 19. The reel 19 includes cylindrical metal ends or conducting hubs 20, and these hubs are freely rotatably mounted in the openings 17 and 18. The main longitudinal portion or roller 21 of the reel is suitably rigidly attached to the hubs 20, and formed of a suitable non-conducting material. The reel portion 21 has a longitudinal recess or groove 22 formed in its outer periphery, and extending throughout its entire length. The portion or roller 21 is further provided with a central axial recess or bore 23, in its end near the casing end 11, and the bore 23 extends near the longitudinal center of the roller 21, and leads into a short reduced bore 24, also terminating near the longitudinal center of the roller. A relatively stationary longitudinal cylindrical rod 25 is disposed centrally within the bore 23, and the inner end of this rod is rotatably received in the reduced bore 24, and piloted therein. The stationary rod 25 includes an outer extension or end portion 26, formed of metal, and having sliding engagement within the metal hub 20 adjacent to the end 11. The extension 26 carries a metal projection or lug 27, which is rectangular, and this lug engages in a rectangular opening 28 in a flat metal conducting strip 29, to hold the rod 25 against rotation. The strip 29 is elongated and disposed vertically, and is rigidly attached to the end 11 by means of screws 30, or the like. The hub 20 at the opposite end of the reel 19 carries a cylindrical metal extension 31, rotatably mounted within an opening 32 in a metal conducting strip 33, similar to the strip 29. The strip 33 is rigidly secured to the end 12, by means of screws 34. End covers or guards 35 are provided, and removably mounted upon the ends 11 and 12. The guards house the conducting strips 29 and 33, and associated elements. An annular space 36 is formed between the bore 23 and rod 25. Disposed within this space, and surrounding the rod 25 is a coil torsion spring 37. The spring 37 has ends 38 and 39; the end 38 is anchored in a small transverse opening in the stationary rod 25, and the end 39 is anchored in a small axial opening in the roller 21 at the inner end of the bore 23. It can thus be seen that when the reel 19 is rotated in one direction, counterclockwise in Figure 3, the spring 37 is wound up and resiliently opposes such rotation.

Wound upon the roller 21 is an electric cord including a pair of insulated wires 40 and 41. These wires have portions disposed in the longitudinal groove 22, and extending in opposite directions toward the metal hubs 20. The ends of the wire portions in the groove 22 engage in notches 42 at the inner edges of the hubs, and are secured therein by soldering, or the like. As shown in Figure 2, the wires 40 and 41 comprising the electric cord are wound upon the roller 21, and over the wire portions disposed in the groove 22. The electric cord includes a plug 43, adapted for electrical connection with a conventional electric iron, not shown. An opening 44 is provided in the removable side 16, to allow passage of the electric cord, and this opening will not permit passage of the plug 43 which is disposed outside of the casing 10. Arranged adjacent to the opening 44, and slightly below the same, is a longitudinal freely rotatable guide roller 45, journalled at its opposite ends in loops or clips 46, securely mounted within recesses 47 in the forward edges of the ends 11 and 12. The outer or forward sides 48 of the clips 46 are flush with the forward edges of the ends 11 and 12. The electric cord engages over the roller 45, as shown in Figure 3. The ends 49 of the removable side 16 prevent endwise displacement of the roller 45.

Mounted upon the casing top 13 is an on and off manually operated switch 50, having a body portion 51 projecting into the casing. Also mounted upon the top 13, near its end remote from the switch 50 is a signal light bulb 52, mounted in socket 53, in turn rigidly secured to the top 13. A handle 54 is provided for the casing, and rigidly secured to the top 13.

Mounted upon the rear side 15 of the casing is an electric socket 55, adapted for electrical connection with a plug 56 of an electrical extension cord 57. A winding bracket 58 is provided, and rigidly mounted upon the rear side 15, above the socket 55. The extension cord 57 may be wound upon the bracket 58, when not in use.

Arranged adjacent to the removable side 16, and at the bottom of the casing 10, is an iron stand or support 59, including an outer casing comprising inner and outer curved sides 60 and 61, an end 62, and a flat bottom 63. The bottom 63 extends beneath the casing bottom 14, and is suitably rigidly secured thereto. The curved sides 60 and 61 converge to a point at one end of the casing 59, as indicated at 64, and the sides 60 and 61 with the end 62 have the shape of the base of an iron. The sides 60 and 61, and end 62 project above the top surface of a flat vertically moveable platform or base 65, and form a rigid upstanding rim or stand 66. The flat horizontal platform 65 conforms to the shape of the sides 60 and 61 and end 62 in plan, and has a central depending projection or plug 67, integral therewith, and carrying a metal contact element 68. This contact element 68 is flat and preferably circular. A block 69 of insulating material is rigidly mounted within the casing 59, and this block has a central recess 70 formed in its bottom, for receiving an annular stationary contact element 71 therein. The contact element 71 is rigidly secured within the recess 70, and has an upper annular shoulder 72, to be engaged by the contact element 68. A spring 73 is disposed inside of the contact element 71, and urges the element 68 upwardly and into electrical contact with the shoulder 72. The spring 73 is seated upon a disc 74 of insulating material, and the disc is rigidly mounted within the recess 70.

Figure 7:
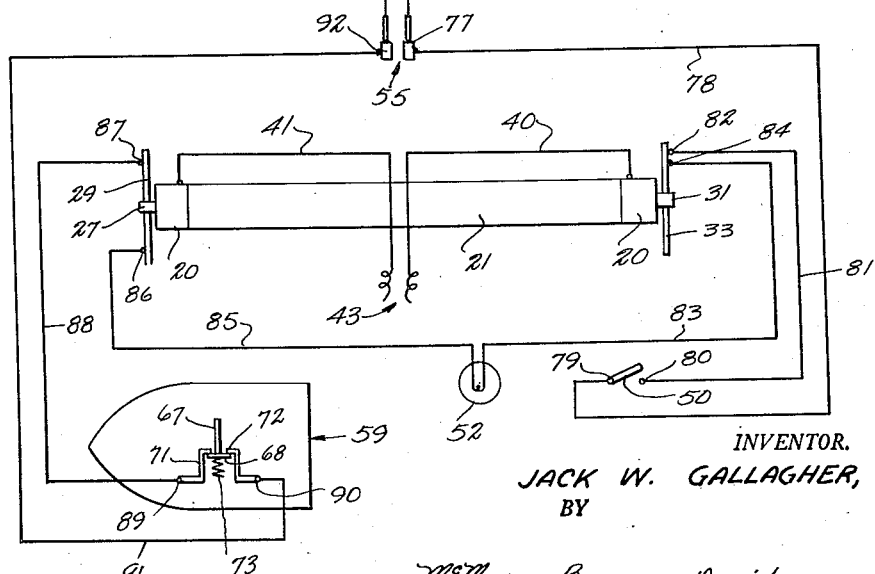

The remainder of the electrical wiring in the device can best be described in connection with Figure 7, wherein the numerals 75 and 76 designate the wires of the extension cord 57, the plug 57' of which is connected with source of current or wall outlet. The wire 75 is electrically connected with one terminal 77 of the socket 55. Also connected with the terminal 77, and disposed within the casing 10, is a wire 78, connected with one terminal 79 of the manual switch 50. The other terminal 80 of this switch is connected with a wire 81, leading to and electrically connected with the contact strip 33, by means of soldering, or the like, as shown at 82. The wires 40 and 41 of the iron electric cord are electrically connected with the metal hubs 20, and the cord plug 43 is connected to the electric iron, not shown, as stated. One terminal of the signal light bulb 52 is connected with a wire 83, electrically connected with the strip 33, as at 84. The opposite terminal of the bulb 52 is connected with a wire 85, connected with the contact strip 29, as at 86, by soldering, or the like. The strip 29 is connected at 87 to a wire 88, in turn connected to one terminal of the contact element 71, as at 89. The other terminal 90 of the element 71 is connected to a wire 91, connected to the other terminal 92 of the socket 55. This terminal 92 is connected to the wire 76 of the extension cord 57.

The operation of the device is as follows.

When the electric iron is in use, the user may move the same over the ironing board, as desired, and the electric cord, including the plug 43, will not become tangled, or get in the way. This is true because of the cord reel 19, which automatically tends to wind up the cord at all times. If the iron is not being used, and it is desired to have current flowing to the same continuously, the iron may be placed upon the rim 66, and out of contact with the platform 65.

In normal use, the manual switch 50 is closed, as are the contact elements 68 and 72, while clothes are being pressed. Current is then flowing to the iron to heat the same. When the user desires to rest, the iron is placed upon the platform 65, which then moves downwardly, and the contact moves downwardly and away from the contact 72, breaking the flow of current to the iron. As soon as the iron is again picked up, the contact 68 closes against the contact 72, and current again flows to the iron. Current will cease to flow to the iron any time that the manual switch 50 is opened. The signal light bulb 52, which may be red, will glow continuously as long as the switch 50 and contacts 68 and 72 are closed, and current flows to the iron. The bulb 52 will extinguish whenever either the switch 50, or contact 68 is open.

When the switch 50 and contact 68 are closed, current flows from the wire 75 through the terminal 77, wire 78, switch 50, wire 81, strip 33, hub extension 31, hub 20, wire 40, electric iron, not shown, wire 41, second hub 20, rod hub 26, lug 27, strip 29, wire 88, contact elements 68 and 72, wire 91, terminal 92, and through the wire 76, completing the circuit. Simultaneously, current will flow through the wire 83, bulb 52, and wire 85. The bulb 52 is connected in parallel with the iron.

Except for the metallic parts which conduct current, all other parts of the device are preferably made of suitable non-conducting material.

It is to be understood that the form of my invention herewith shown and described is to be taken as a preferred example of the same, and that various changes in the shape, size and arrangement of parts may be resorted to, without departing from the spirit of the invention, or the scope of the subjoined claims.

Having thus described the invention, I claim:

1. A cord reel for use in connection with an electric iron, comprising a support including upstanding ends formed of insulating material and having aligned openings, conducting plates secured to the outer faces of said ends and extending across the aligned openings and provided with small openings which lead into the openings of the upstanding ends, a rotatable insulating roller disposed between the upstanding ends adjacent to the aligned openings of the ends, cylindrical metallic hubs secured to the opposite ends of the insulating roller and journalled within the aligned openings of the upstanding ends, one metallic hub including a reduced end extension journalled within the small opening of the adjacent conducting plate, the other metallic hub having a bore disposed substantially in alignment with the small opening of the other conducting plate, a rod including a part fixedly secured within the small opening of the last mentioned conducting plate, the rod extending through said bore of the adjacent metallic hub, a spring connected with the insulating roller and with the rod and serving to rotate the roller and metallic hubs in one direction, a cord to be wound upon the insulating roller and including wires, one wire being electrically connected with one metallic hub and the other wire with the other metallic hub, and circuit forming means including wires electrically connected with the conducting plates.

2. An electric cord reel, comprising a support including spaced upstanding insulating ends having aligned openings, flat conducting plates secured to the outer faces of the ends and extending across the openings, a pair of cylindrical conducting hubs arranged adjacent to the upstanding ends and journalled within the aligned openings and contacting said conducting plates extending across said aligned openings, one cylindrical conducting hub having an axial bore, an insulating roller extending between the inner ends of said conducting hubs and secured to the conducting hubs for rotation therewith, the end of the insulating roller adjacent to the conducting hub having the axial bore being provided with an axial opening arranged in communication with the axial bore of the hub, a non-rotatable rod mounted within the axial opening of the roller and extending through the bore of the adjacent conducting hub and having its outer end fixedly secured to the adjacent conducting plate, a spring mounted within the axial opening of the roller and having one end connected with the roller and its opposite end connected with the rod, the spring serving to rotate the roller and conducting hubs as a unit in one direction, an electric cord wound upon the insulating roller and including wires, one wire being electrically connected with one conducting hub and the other wire with the other conducting hub, and circuit forming means including wires electrically connected with said conducting plates.

JACK W. GALLAGHER.

REFERENCES CITED

The following references are of record in the file of this patent:

UNITED STATES PATENTS

| Number | Name | Date |
|---|---|---|
| 1,681,132 | Reynolds | Aug. 14, 1928 |
| 1,731,086 | Wise | Oct. 8, 1929 |
| 1,872,528 | Temple | Aug. 16, 1932 |
| 2,108,581 | Duffy | Feb. 15, 1938 |